(12) United States Patent
Helfer et al.

(10) Patent No.: US 8,408,837 B2
(45) Date of Patent: Apr. 2, 2013

(54) COLLETS FOR USE WITH VALVES

(75) Inventors: Wade Jonathon Helfer, Ames, IA (US); Jason Gene Olberding, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 703 days.

(21) Appl. No.: 12/262,967

(22) Filed: Oct. 31, 2008

(65) Prior Publication Data

US 2010/0108930 A1 May 6, 2010

(51) Int. Cl.
F16K 31/00 (2006.01)
(52) U.S. Cl. ............... 403/371; 251/292; 251/304
(58) Field of Classification Search .......... 403/369, 403/374, 374.2; 464/81; 279/2.02, 2.04; 251/292, 304; 137/250
See application file for complete search history.

(56) References Cited

U.S. PATENT DOCUMENTS

| | | | |
|---|---|---|---|
| 172,689 | A | 1/1876 | Barrett |
| 1,521,202 | A | 12/1924 | Osgood |
| 1,857,012 | A | 5/1932 | Corley |
| 2,602,672 | A | 7/1952 | Wiard |
| 2,835,498 | A | 5/1958 | Howes |
| 2,888,282 | A | 5/1959 | Naimer |
| 3,141,678 | A | 7/1964 | Garrison |
| 3,190,609 | A | 6/1965 | Kintigh |
| 3,727,928 | A | 4/1973 | Benjamin |
| 3,839,882 | A | 10/1974 | Gilarski, Jr. |
| 4,202,644 | A | 5/1980 | Soussloff |
| 4,282,419 | A | 8/1981 | Auer |
| 4,808,049 | A | 2/1989 | Cook |
| 4,909,095 | A | 3/1990 | Carlson |

(Continued)

FOREIGN PATENT DOCUMENTS

| | | |
|---|---|---|
| DE | 3827428 | 2/1990 |
| DE | 3927396 | 10/1990 |

(Continued)

OTHER PUBLICATIONS

United States Patent and Trademark Office, "Non-Final Office Action," issued in connection with U.S. Appl. No. 12/262,983, mailed May 25, 2010, 30 pages.

(Continued)

*Primary Examiner* — Joshua Kennedy
(74) *Attorney, Agent, or Firm* — Hanley, Flight & Zimmerman, LLC (57) ABSTRACT

Collets for coupling rotary actuators to valves are disclosed. An example collet includes a first plurality of flexible members configured to be coupled to an elongated member and each having a first inner surface and a first outer surface. The first inner surface and the first outer surface define a first cross-sectional shape. The example collet further includes a second plurality of flexible members configured to be coupled to the elongated member and each having a second inner surface and a second outer surface. The second inner surface and the second outer surface define a second cross-sectional shape that is different from the first cross-sectional shape of the first plurality of flexible members. The first and the second outer surfaces are to engage a third inner surface of an opening of a lever that is configured to cause the first and the second plurality of flexible members to be displaced toward an axis of the elongated member to cause the first and the second inner surfaces to engage one or more surfaces of the rectangular shaft.

31 Claims, 5 Drawing Sheets

U.S. PATENT DOCUMENTS

| | | | |
|---|---|---|---|
| 4,940,249 | A | 7/1990 | Drbal |
| 5,100,420 | A | 3/1992 | Green et al. |
| 5,176,464 | A | 1/1993 | Tanner |
| 5,197,738 | A | 3/1993 | Hartman, Sr. |
| 5,744,773 | A | 4/1998 | Van Otteren et al. |
| 5,823,499 | A | 10/1998 | Ito et al. |
| 5,975,106 | A | 11/1999 | Morgan et al. |
| 6,193,241 | B1 | 2/2001 | Robison |
| 6,461,084 | B1 | 10/2002 | Stuart |
| 6,666,129 | B1 | 12/2003 | Schmid et al. |
| 6,742,786 | B2 | 6/2004 | Casel et al. |
| 6,857,448 | B2 | 2/2005 | Schwartzman |
| 7,090,257 | B2 * | 8/2006 | Werth ............. 285/243 |
| 7,740,228 | B2 | 6/2010 | Simpson et al. |
| 7,955,021 | B2 | 6/2011 | Brestel et al. |
| 2003/0014854 | A1 | 1/2003 | Brown |
| 2003/0078616 | A1 * | 4/2003 | Ginn et al. ............. 606/213 |
| 2003/0084556 | A1 | 5/2003 | Dunlop |
| 2004/0255418 | A1 * | 12/2004 | Minkler et al. ............. 15/210.1 |
| 2005/0047885 | A1 * | 3/2005 | Hyatt et al. ............. 409/132 |
| 2005/0222614 | A1 * | 10/2005 | Ginn et al. ............. 606/213 |
| 2005/0274416 | A1 | 12/2005 | Engle et al. |
| 2006/0175770 | A1 | 8/2006 | Linzell |
| 2006/0255303 | A1 | 11/2006 | Denike et al. |
| 2007/0034258 | A1 | 2/2007 | Parsons et al. |
| 2007/0246900 | A1 * | 10/2007 | Oshnock et al. ............. 279/9.1 |
| 2008/0048403 | A1 | 2/2008 | Oldberding et al. |
| 2008/0197312 | A1 | 8/2008 | Brinks |
| 2009/0304443 | A1 | 12/2009 | Moore |
| 2010/0108931 | A1 | 5/2010 | Dalluge et al. |
| 2010/0176562 | A1 | 7/2010 | Linzell |
| 2010/0274281 | A1 * | 10/2010 | Ginn et al. ............. 606/213 |

FOREIGN PATENT DOCUMENTS

| | | |
|---|---|---|
| EP | 0524589 | 1/1993 |
| GB | 2327463 | 1/1999 |
| GB | 2327464 | 1/1999 |

OTHER PUBLICATIONS

International Bureau, "International Preliminary Report on Patentability," issued in connection with international application serial No. PCT/US2009/057873, issued May 3, 2011, 6 pages.

International Bureau, "International Preliminary Report on Patentability," issued in connection with international application serial No. PCT/US2009/057870, issued May 3, 2011, 6 pages.

United States Patent and Trademark Office, "Notice of Allowance," issued in connection with U.S. Appl. No. 12/262,983, mailed Feb. 2, 2011, 15 pages.

United States Patent and Trademark Office, "Notice of Panel Decision from Pre-Appeal Brief Review," issued in connection with U.S. Appl. No. 12/262,983, mailed Jan. 26, 2011, 2 pages.

United States Patent and Trademark Office, "Final Office Action," issued in connection with U.S. Appl. No. 12/262,983, mailed Sep. 3, 2010, 16 pages.

International Searching Authority, "International Search Report," issued in connection with corresponding international application serial No. PCT/US2009/057873, mailed Dec. 22, 2009, 4 pages.

International Searching Authority, "Written Opinion of the International Searching Authority," issued in connection with corresponding international application serial No. PCT/US2009/057873, mailed Dec. 22, 2008, 5 pages.

International Searching Authority, "International Search Report," issued in connection with international application serial No. PCT/US2009/057870, mailed Dec. 22, 2009, 4 pages.

International Searching Authority, "Written Opinion of the International Searching Authority," issued in connection with international application serial No. PCT/US2009/057870, mailed Dec. 22, 2009, 5 pages.

International Searching Authority, "International Search Report," issued in connection with international application serial No. PCT/US2009/057876, mailed Dec. 22, 2009, 4 pages.

International Searching Authority, "Written Opinion of the International Searching Authority," issued in connection with international application serial No. PCT/US2009/057876, mailed Dec. 22, 2009, 6 pages.

United States Patent and Trademark Office, "Notice of Allowance," issued in connection with U.S. Appl. No. 12/262,958, mailed Feb. 29, 2012, 30 pages.

United States Patent and Trademark Office, "Non-Final Office Action," issued in connection with U.S. Appl. No. 12/262,958, mailed Aug. 10, 2011, 27 pages.

Metso Automation, "Pneumatic Double Diaphragm Actuator Series E," published Jul. 2002, 8 pages.

* cited by examiner

COLLETS FOR USE WITH VALVES

FIELD OF THE DISCLOSURE

The present disclosure relates generally to control valves and, more particularly, to collets for use with valves.

BACKGROUND

Fluid process systems typically use valves such as, for example, rotary valves to control the flow of process fluids. In general, rotary valves typically include a flow rate control member disposed in a fluid path and rotatably coupled to the body of the rotary valve via a shaft. Typically, a portion of the shaft extending from the rotary valve is operatively coupled to an actuator (e.g., a pneumatic actuator, an electric actuator, a hydraulic actuator, etc.), which operates the flow control member. To couple the actuator to the valve shaft, a lever or lever arm is typically employed. The lever converts a rectilinear displacement of an actuator stem into a rotational displacement of the valve shaft. Thus, rotation of the lever causes the valve shaft and the flow control member (e.g., a disk, a ball, etc.) to rotate to increase or restrict the flow of fluid through the valve. In operation, a positioner may be used to control the displacement of the actuator to rotate the lever and the valve shaft and, thus, the flow control member of the valve to a desired angular position to achieve a desired fluid flow through the rotary valve.

Industry standards (e.g., International Organization for Standardization) provide a means to couple an actuator to differently sized valve shafts. Adherence to the ISO standard requires that actuators and valves made by multiple or different manufacturers can be interchangeably coupled to each other without requiring modification of the actuators or the valves. To facilitate the compatibility of control valves with a variety of actuators, many available actuators have shaft couplings such as, for example, a square bore that can receive differently sized square valve shafts.

Some known collets have a cylindrically-shaped outer surface or portion having a substantially circular transverse cross-section that engages a cylindrically-shaped inner surface of the lever. However, cylindrically-shaped collets having engagement ends with substantially circular cross-sections may be prone to lost motion between the collet and the collet holder or lever if a torque reversal occurs. During throttling applications, the actuator imparts a torque to the valve shaft via the lever to cause the flow control member to change rotational directions between a clockwise and counter-clockwise direction to achieve a desired flow rate through the valve. This change in rotational direction may cause a cylindrically-shaped collet to slip at the connection between the collet and the lever, resulting in lost motion between the collet and the lever. In general, such lost motion may lead to inaccurate positioning of the flow control member and, thus, poor control of the flow flowing through the valve.

SUMMARY

In one example, a shaft coupling assembly for use with rotary valves includes an elongated member having a first end and a second end in which a coupling portion is coupled to the first end of the elongated member and having a cross-sectional shape that has a first dimension along a first axis that is substantially larger than a second dimension along a second axis perpendicular to the first axis and a first opening configured to receive a rectangular shaft. The coupling portion includes at least a first flexible member having a first surface that at least partially defines the first opening and a second surface that at least partially defines the cross-sectional shape of the coupling portion. The shaft coupling assembly further includes a sleeve having a second opening to receive the elongated member and a third opening having a third surface configured to receive the coupling portion.

In another example, a collet for use with a rectangular shaft includes a first plurality of flexible members configured to be coupled to an elongated member and each having a first inner surface and a first outer surface. The first inner surface and the first outer surface define a first cross-sectional shape. The example collet further includes a second plurality of flexible members configured to be coupled to the elongated member and each having a second inner surface and a second outer surface. The second inner surface and the second outer surface define a second cross-sectional shape that is different from the first cross-sectional shape of the first plurality of flexible members. The first and the second outer surfaces are to engage a third inner surface of an opening of a lever that is configured to cause the first and the second plurality of flexible members to be displaced toward an axis of the elongated member to cause the first and the second inner surfaces to engage one or more surfaces of a rectangular shaft.

In yet another example, an example collet includes a coupling portion coupled to an elongated member and having outer surfaces defining an oblong shape and a first opening configured to receive a rectangular shaft. The coupling portion comprises a first flexible member having a first inner surface that at least partially defines the first opening and a first curved outer surface that at least partially defines the outer surfaces of the coupling portion. The coupling portion further comprises a second flexible member adjacent the first flexible member and having a second inner surface that at least partially defines the first opening and a second curved outer surface that at least partially defines the outer surfaces of the coupling portion.

DETAILED DESCRIPTION

The example collets disclosed herein may be used to couple differently sized, substantially square or rectangular valve shafts to control valve actuators. As used herein, the term "substantially rectangular" includes substantially square geometries. In contrast to known coupling techniques, the example collets described herein are configured to provide a substantially tight coupling between a lever and a substantially rectangular (e.g., square) shaft without requiring the use of wedges, shaft keys or the like. In operation, the example collets described herein substantially eliminate lost motion between actuators and closure members (e.g., a valve plug). In addition, the example collets described herein may facilitate the coupling and decoupling of actuators and valve shafts for purposes of, for example, installation processes, repair processes, etc.

As described in greater detail below, an example collet may include a coupling portion having an outer surface or surfaces that form or define a substantially oblong-shaped cross-section. The coupling portion may include at least one flexible member (e.g., a tang, finger-like projection, etc.) having an inner surface configured to engage a rectangular or square shaft, and a tapered outer surface that includes a curved surface portion to engage a tapered inner surface of a coupling component such as, for example, a lever or a sleeve. The flexible member may be coupled to a first end of an elongated member and displaced toward an axis of the elongated member by the coupling component. Additionally, the outer surface may include a substantially planar surface or portion adjacent and recessed relative to the curved surface to provide greater flexibility to the flexible member to facilitate displacement of the flexible member toward the axis of the elongated member when coupled to the coupling component. In general, any number of flexible members may be used to implement the example collets described herein. Additionally, a first flexible member may include a first cross-section that is shaped and/or sized differently than a cross-section of a second flexible member.

The oblong-shaped outer surface of the example collets described herein advantageously reduces or substantially eliminates slippage between a lever and the collet. Such reduction or elimination of slippage is particularly advantageous during throttling applications, in which an actuator imparts a torque to the lever to cause the lever to rotate a closure member in a first direction (e.g., toward an open position) and imparts a torque to the lever to cause the lever to rotate the closure member in a second direction (e.g., toward a closed position) opposite the first direction. Such a directional change in torque or torque reversal may cause an outer surface of the collet to slip within the coupling component (e.g., the lever). For example, the oblong-shaped outer surface of the example collets described herein engages an oblong-shaped inner surface of the coupling component (e.g., a lever) to provide a substantially tight fit or connection between the coupling component and the collet to prevent or minimize lost motion between the coupling component and the collet and, thus, lost motion between the actuator and the flow control member of the valve associated with the coupling component and the collet.

Figure 1A:
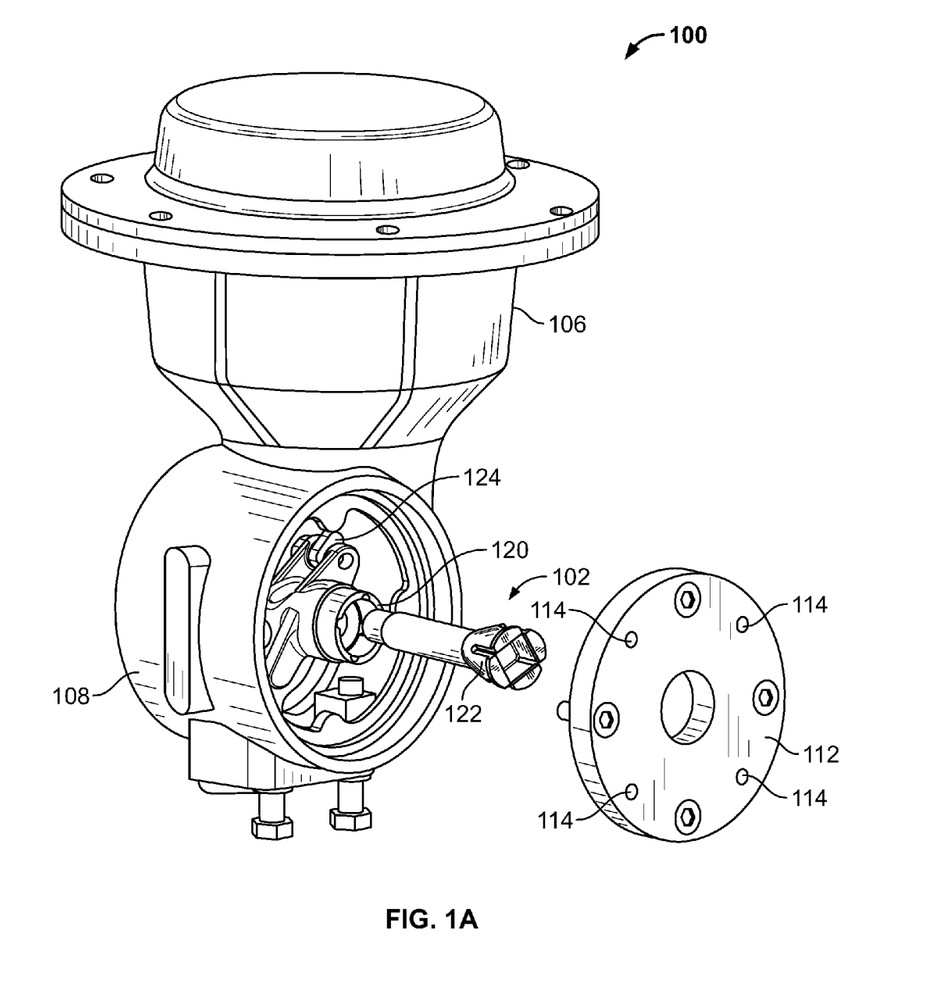
FIG. 1A illustrates an example rotary actuator assembly having an example collet and lever described herein.
Figure 1B:
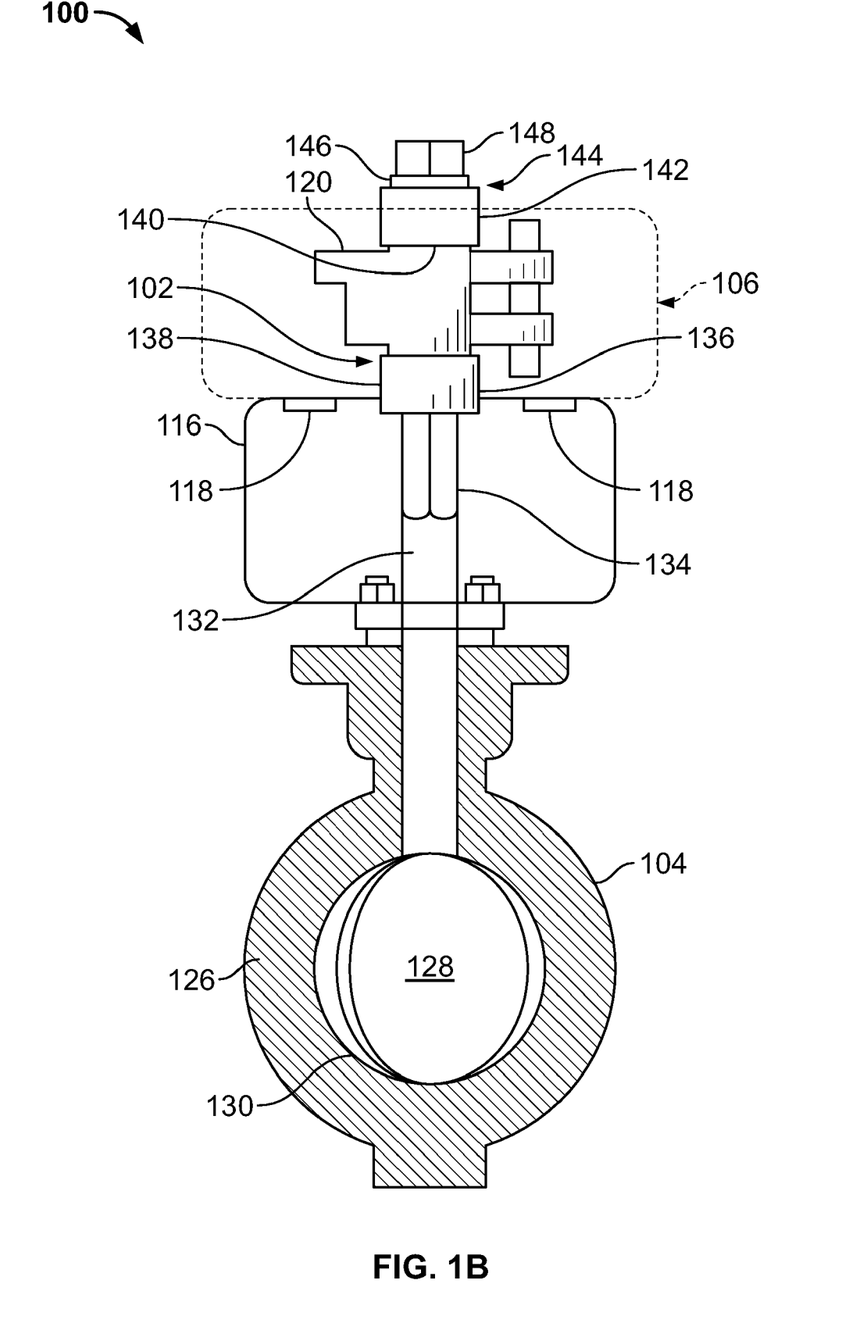
FIG. 1B illustrates a rotary valve that may be used to implement the rotary actuator assembly of FIG. 1A.

FIG. 1A illustrates an example rotary actuator assembly 100 having an example coupling assembly 102 described herein. FIG. 1B illustrates a rotary valve 104 that may be used to implement the rotary actuator assembly 100 of FIG. 1A. In general, the example rotary actuator assembly 100 includes an actuator 106 operatively coupled to the rotary valve 104 via the coupling assembly 102. The actuator 106 is configured to actuate (i.e., rotate, turn, etc.) to open/close the rotary valve 104 to control the flow rate through the valve 104.

Referring to FIG. 1A, the actuator 106 (e.g., a diaphragm actuator, a piston actuator, etc.) is coupled to a housing 108 of the rotary actuator assembly 100. The housing 108 includes a first faceplate 112 and a second faceplate (not shown) opposite the first faceplate 112 (i.e., the backside of the actuator 106). The first faceplate 112 and the second faceplate are substantially similar or identical, which enables a field configurable fail-safe operation of the actuator 106. The first face plate 112 includes a plurality of mounting holes 114 for mounting the rotary valve 104 to the actuator 106. A mounting bracket 116 (FIG. 1B) mounts the rotary valve 104 to the faceplate 112 via fasteners 118 (FIG. 1B) or any other suitable fastening mechanism that passes into and/or through the mounting holes 114.

As illustrated in FIG. 1A, the first faceplate 112 is removed from the actuator 106 to expose the coupling assembly 102. The coupling assembly 102 includes an example lever 120 that couples to or engages an example collet 122. The assembly of the lever 120 and the collet 122 is described in greater detail below. The collet 122 operatively couples the rotary valve 104 to the actuator 106. The actuator 106 includes an actuator stem (not shown) having a rod end bearing 124 that couples to the lever 120.

Referring to FIG. 1B, the rotary valve 104 includes a valve body 126 that houses a flow control member 128 and a seating surface for a seal ring 130. The flow control member 128 engages the seal ring 130 to control the flow of fluid through the valve 104. The flow control member 128 is coupled to a valve shaft 132 which, in turn, is coupled to the lever 120 via the collet 122. The valve shaft 132 has a substantially square end 134 and may conform to an ISO standard for square shafts. However, the valve shaft 132 may be implemented using any other shape (e.g., any polygonal shape) and/or size. As described in greater detail below, the collet 122 is configured to apply a clamping force to the valve shaft 132 of the rotary valve 104 when the collet 122 is coupled to the lever 120.

As shown in FIG. 1B, a first end 136 of the lever 106 provides a first sleeve 138 that is configured to receive or engage the example collet 122 to form the coupling assembly 102. In a similar manner, a second end 140 of the lever 106 provides a second sleeve 142 through which the example collet 122 may be inserted to form a second coupling 144. The example collet 122 may be drawn into the lever 120 so that the first sleeve 138 or the second sleeve 142 engages the example collet 122 (i.e. the lever may be reversible). As described in greater detail below, the lever 120 engages a washer 146 and a fastener 148 to draw the collet 122 within the lever 120 to cause the collet 122 to apply a clamping force to the valve shaft 132.

In operation, the rotary actuator assembly 100 receives a control signal such as, for example, compressed air, to displace a diaphragm plate (not shown) within the actuator. The diaphragm plate is directly coupled to the actuator stem (not shown) which is coupled to the lever 120. The displacement of the diaphragm plate results in a corresponding rectilinear displacement of the actuator stem. The rectilinear displacement of the actuator stem is converted into a rotational displacement of the lever 120, whereby the lever 120 imparts a rotational force or torque to the valve shaft 132 via the collet 122 to rotate the closure member 128 to a desired angular position to vary or control the flow flowing through the rotary valve 104. For example, the actuator 106 imparts a first torque to the lever 120 to rotate the closure member 128 in a first direction and imparts a second torque to the lever 120 to rotate a closure member 128 in a second direction opposite the first direction. Such directional change in torque or torque reversal may cause the collet 122 to slip within the lever 120 if the collet 122 is not properly sized or tightly coupled to the lever 120. When the flow control member 128 is closed, the flow control member 128 engages the seal ring 130 that encircles the flow path through the rotary valve 104 to prevent the flow of fluid through the valve 104.

Throttling the flow control member 128 may involve adjusting and controlling the position of the flow control member 128 between a fully open position and a fully closed position to achieve a desired process flow rate and/or pressure. In addition, throttling the flow control member 128 may be performed in connection with a feedback system (not shown) that is configured to continuously measure the flow and/or pressure of a process fluid. The feedback system may then cause, for example, the actuator 106 to at least partially actuate the lever 120 in response to changes in the flow and/or pressure of the process fluid. In throttling applications, minimizing or reducing lost motion between the lever 120 and the valve shaft 132 is important to achieving precise positioning of the flow control member 128. Such lost motion typically causes the actual position of a flow control member to deviate from a desired position. Substantially reducing or preventing such lost motion from occurring provides more accurate and improved valve performance. Resistance to slippage caused by torque reversal may be minimized or substantially reduced by providing a tight fitting connection between the lever 120 and the collet 122.

Figure 2A:
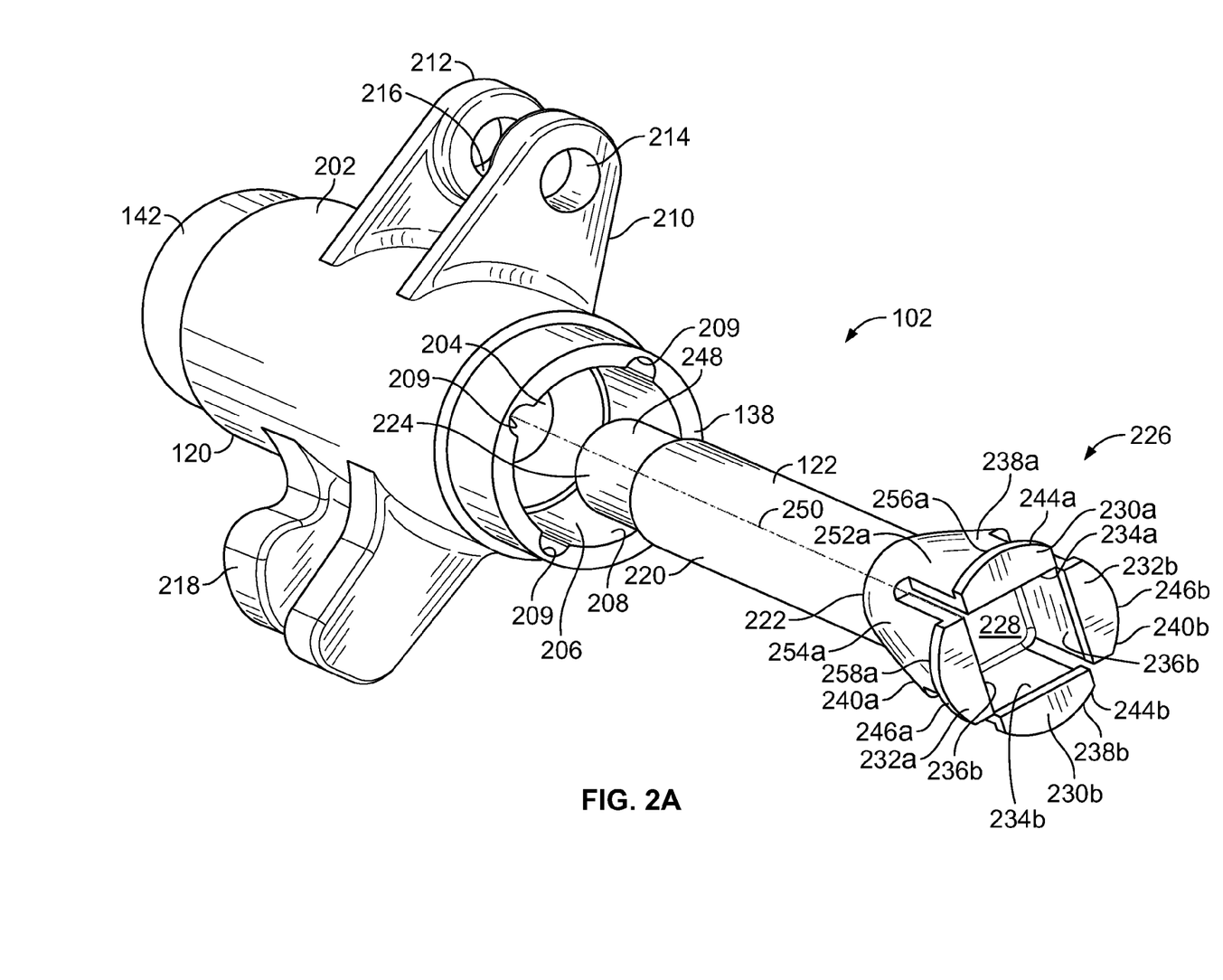
FIG. 2A illustrates the example collet and lever of FIGS. 1A and 1B.
Figure 2B:
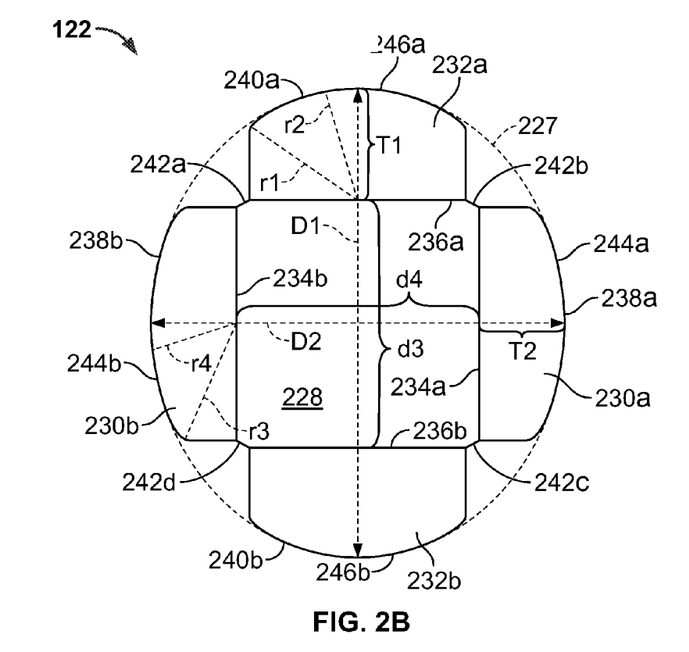
FIG. 2B illustrates an end view of the example collet of FIG. 2A

FIG. 2A illustrates the example lever 120 and the example collet 122 shown in FIG. 1A. FIG. 2B is an end view of the example collet 122 of FIGS. 1A and 2A. In an assembled configuration, the example lever 120 and the example collet 122 forms a coupling such as, for example, shown in FIGS. 1A and 1B. The lever 120 includes a body 202 having a first opening or aperture 204 substantially near the center of the body 202. The sleeve 138 includes a second opening 206 having a diameter that is larger than the diameter of the opening 204. The second opening 206 has surfaces that define an oblong-shaped (e.g., elliptical, oval, etc.) cross-section and, more particularly, an oblong-shaped (e.g., an elliptical-shaped, an oval-shaped) inner surface 208 that tapers inwardly toward the first opening 204. The inner surface 208 may also include a plurality of recess portions 209 (e.g., dimples) to substantially reduce interference when the collet 122 is drawn in the lever 120. In some examples, the second sleeve 142 of the lever 120 may also include a third opening (not shown) opposite the second opening 206 having surfaces that define an oblong-shaped (e.g., elliptical, oval, etc.) cross-section and, more particularly, an oblong-shaped (e.g., an elliptical-shaped, oval, etc.) inner surface that tapers inwardly toward the first opening 204. In the illustrated example, the sleeves 138 and 142 are integrally formed with the lever 120. However, in other examples, the sleeves 138 and/or 142 may be received by or coupled to the lever 120 in any other suitable manner(s).

The lever 120 includes lever arms 210 and 212 that extend from the body 202. The arms 210 and 212 include apertures or mounting hole 214 and 216, respectively, to receive a fastener (not shown) to rotatably couple the lever 120 to the rod end bearing 124 (FIG. 1A) of the actuator stem. Additionally, the body 202 may include a cam 218 that operatively couples to a positioner (not shown), which provides feedback to control the valve 100 based on the position on the cam 218.

Referring also to FIG. 2B, the collet 122 includes an elongated member 220 having a first end 222 and a second end 224. The first end 222 includes a coupling portion 226 having outer surfaces that define a substantially oblong-shaped cross-section depicted by broken line 227 that has a first length dimension D1 (e.g., a major axis) along a first axis that is greater than a second length dimension D2 (e.g., a minor axis) along a second axis substantially perpendicular to the first axis, and a third length dimension d3 that is equal to a fourth length dimension d4 to form a substantially square inner bore 228. In the illustrated example, the coupling portion 226 is integrally formed with the elongated member 220 to form a substantially unitary piece or structure. However, in other examples, the coupling portion 226 couples to the elongated member 220 via any suitable fastening mechanism(s).

As shown in FIGS. 2A and 2B, the coupling portion 226 comprises a first plurality of flexible members or finger portions 230*a-b* and a second plurality of flexible members or finger portions 232*a-b*. The first plurality of flexible members 230*a-b* and the second plurality of flexible members 232*a-b* have respective inner surfaces 234*a-b* and 236*a-b* that form or define at least a portion of the substantially square bore 228, which is configured to receive a square valve shaft, such as, for example the valve shaft 132 of FIG. 1B. The first plurality of flexible members 230*a-b* and the second plurality of flexible members 232*a-b* also include respective outer surfaces 238*a-b* and 240*a-b* that are tapered to matably engage the tapered surface 208 of the second opening 206. The first and second plurality of flexible members 230*a-b* and 232*a-b* may be formed by slits 242*a-d*.

The outer surfaces 238*a-b* and 240*a-b* include respective curved surfaces or portions 244*a-b* and 246*a-b* that form or define at least a portion of the outer surfaces of the coupling portion 226. The curved outer surfaces 244*a-b* and 246*a-b* of the flexible members 230*a-b* and 232*a-b*, respectively, define at least part of the oblong-shaped (e.g., elliptical-shaped) cross-section 227 of the coupling portion 226. The flexible members 230*a-b* have a cross-sectional shape that is different from a cross-sectional shape of the flexible members 232*a-b*. For example, the flexible members 232*a-b* have a cross-section having a thickness T1 and the flexible members 230*a-b* have a cross-section having a thickness T2, which is less than the thickness T1. Additionally or alternatively, each of the curved outer surfaces 244*a-b* has a first radius of curvature r1 that is different than a second radius of curvature r2 and each of the curved outer surfaces 246*a-b* have a first radius of curvature r3 that is different than a second radius of curvature r4. Furthermore, the first and second radii of curvature r1 and r2 of the outer surfaces 244*a-b* are different from the first and second radii of curvature r3 and r4 of the outer surfaces 246*a-b*, respectively.

The coupling portion 226 engages the inner surface 208 of the second opening 206. The oblong-shaped coupling portion 226 and inner surface 208 matably engage to reduce lost motion due to torque reversals during, for example, throttling applications. Thus, the coupling portion 226 advantageously reduces or substantially eliminates slippage or rotation between the outer surfaces 244*a-b* and 246*a-b* of the collet 122 and the inner surface 208 of the lever 120.

The example collet 122 may be drawn into the lever 120 using a drawing or pulling technique. As described above in connection with FIGS. 1A and 1B, the washer 146 and the fastener (e.g., a draw nut) 148 may be used to draw or pull the example collet 122 toward and/or into the sleeve 138. For example, the elongated member 220 may have an externally threaded portion 248 at the second end 224 that extends through the opening 204 of the lever 120 and the washer 146 to threadably engage the draw nut 148. In this manner, tightening the draw nut 148 pulls the example collet 122 into the lever 120 and, as a result, the inner surface 208 of the second opening 206 matably engages with the curved surface portions 244*a-b* and 246*a-b* to cause the flexible members 230*a-b* and 232*a-b* to move inwardly to engage a shaft in the bore 228 as described below. In an alternative configuration, the elongated member 220 may include inner threads (not shown) and a draw bolt (instead of the draw nut 148) that engages the inner threads to draw the example collet 122 into the lever 120. The recess portions 209 reduce interference when the collet 122 is drawn into the lever 120 and allows the inner surface 208 of the lever 120 to firmly contact the outer surfaces 238*a-b* and 240*a-b* of the collet 122 at concentrated locations such as, for example, the corner surfaces of the curved surface portions 244a-b and 246a-b.

As the collet 122 is drawn into the lever 120, the tapered surface 208 of the second opening 206 engages the tapered outer surfaces 238a-b and 240a-b to cause the flexible members 230a-b and 232a-b to be flexed or driven toward an axis 250 of the elongated member 220, thereby causing the flexible members 230a-b and 232a-b to flex to decrease the dimensions of the bore 228. In this manner, the example collet 122 may directly engage, for example, the valve shaft 132, thereby reducing and/or eliminating any gaps between the surfaces of the square bore 228 and the surfaces of the valve shaft 132.

As most clearly shown in FIG. 2A, the outer surfaces 238a and 240a may also include planar (e.g., substantially flat) surface portions 252a and 254a adjacent and recessed relative to the curved surface portions 244a and 246a, respectively. Although not shown, the outer surfaces 238b and 240b also include such planar surfaces adjacent the curved surface portions 244b and 246b. The planar portions 252a and 254a provide a region having a thinner wall thickness than the curved portions 244a and 246a. Although not shown, the outer surfaces 238b and 240b also include planar surfaces adjacent the curved surface portions 244b and 246b that form respective steps between the planar portions and the curved portions 244b and 246b. The difference in thicknesses between the planar portions 252a and 254a and the curved portions 244a and 246a forms respective steps 256a and 258a between the planar portions 252a and 254a and the curved portions 244a and 246a. The thinner planar portions 252a and 254a provide greater flexibility to the flexible members 230a-b and 232a-b to facilitate displacement of the flexible members 230a-b and 232a-b toward the axis 250 of the elongated member 220 to decrease the dimensions of the bore 228 and provide a greater clamping force to a valve shaft when the collet 122 is drawn into the lever 120.

When a shaft (e.g., the valve shaft 132 of FIG. 1B) is positioned within the bore 228, the inner clamping surfaces 234a-b and 236a-b directly engage and apply a clamping force to the valve shaft 132 so that a substantially tight fit is achieved between the inner clamping surfaces 234a-b and 236a-b and one or more surfaces of the valve shaft 132. Lost rotational motion (i.e., lost motion) between the lever 120 and the valve shaft 132 is substantially reduced or eliminated by eliminating the gaps between the surfaces of the square bore 228 and the valve shaft 132 via the example collet 122. Additionally, as the collet 122 is drawn or pulled by the draw nut 148 into the lever 120, the inner surface 208 of the sleeve 138 matably engages the coupling portion 226 to provide a tight coupling between the lever 120 and the collet 122 to further reduce or minimize lost motion between the lever 120 and the collet 122. As noted above, this tight coupling between the lever 120 and the collet 122 is particularly advantageous during throttling applications, which may otherwise cause the lever 120 and the collet 122 to slip due to torque reversal imparted on the lever 120 and the collet 122.

Over time and through the continuous operation of a valve (e.g., the valve 100 of FIGS. 1A and 1B), the surfaces of the valve shaft may wear. This may cause loosening of the initial coupling between a shaft and an actuator. However, with the example collets described herein such as, for example, the example collet 122, a substantially tight fit or coupling between an actuator (e.g., the actuator 106) and valve shaft (e.g., the shaft 132) may be maintained or easily restored by tightening the draw nut 148 or bolt to draw the example collet 122 further into the sleeve 138 of the lever 120 and further displace the flexible members 230a-b and 232a-b toward the shaft.

The coupling portion 226 of the example collet 122 and/or the inner surface 208 of the sleeve 138 may be formed via investment casting, or any other suitable process(es). Additionally, although the example collet 122 is shown as having four flexible members 230a-b and 232a-b, it is possible to implement the example collet 122 using fewer or more flexible members. For example, the example collet 122 may be implemented using a single flexible member that applies a force to one of the surfaces of the valve shaft 132. In such a case, an inner surface of the flexible member at least partially defines a portion of a rectangular bore of the collet and an outer surface of the flexible member at least partially defines a portion of an oblong-shaped outer surface of the collet. In other examples, the example collet may include a first flexible member such as, for example, the flexible member 230a adjacent a second flexible member such as, for example, the flexible member 232a configured to form at least a portion of the outer surfaces of the coupling portion 226 and at least a portion of the inner bore 228.

Figure 3A:
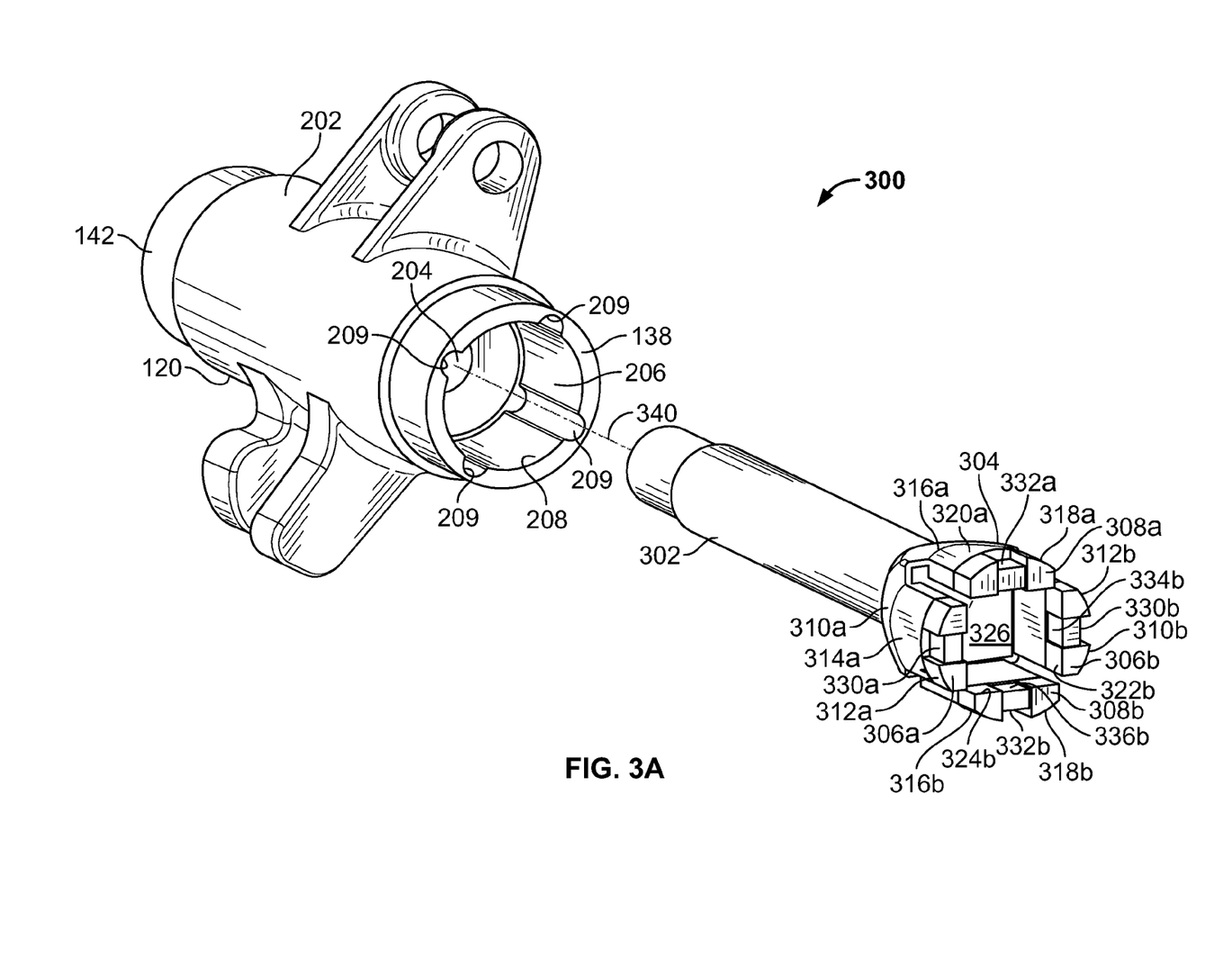
FIG. 3A illustrates another example collet described herein.
Figure 3B:
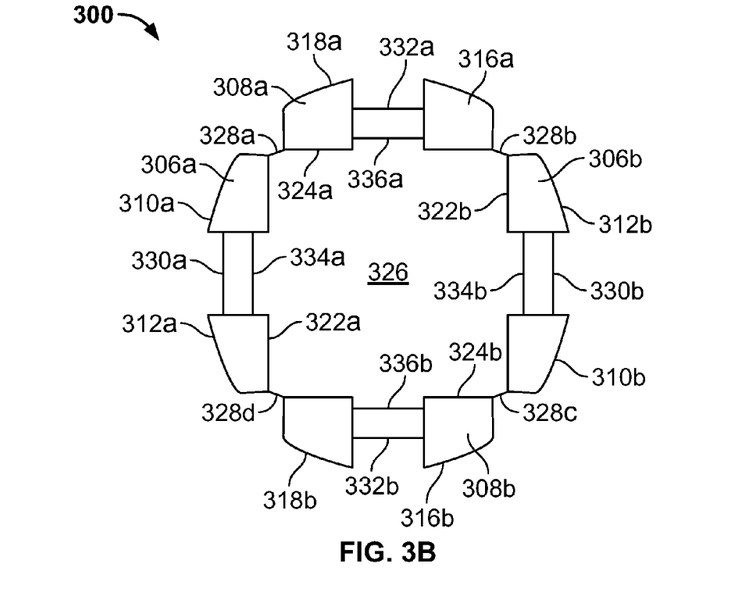
FIG. 3B illustrates an end view of the example collet of FIG. 3A.

FIG. 3A illustrates another example collet 300 described herein that may be used with the example lever 120 of FIGS. 1A, 2A and 2B. FIG. 3B is an end view of the example collet 300 of FIG. 3A. Referring to FIGS. 3A and 3B, the example collet 300 includes an elongated member 302 and a coupling portion 304. The coupling portion 304 has outer surfaces that form or define a substantially oblong-shaped transverse cross-section. As shown in FIGS. 3A and 3B, the coupling portion 304 includes a first plurality of flexible members 306a-b and a second plurality of flexible members 308a-b. The first plurality of flexible members 306a-b include respective tapered outer surfaces 310a-b having curved portions 312a-b adjacent planar (e.g., substantially flat) recessed portions 314a-b. Likewise, the second plurality of flexible members 308a-b includes respective tapered outer surfaces 316a-b having curved portions 318a-b adjacent planar portions 320a-b. Each of the curved portions 312a-b and 318a-b has a curved edge that has a first radius of curvature (e.g., similar to the radius of curvature r1 of FIG. 2B) that is different than a second radius of curvature (e.g., similar to the radius of curvature r2 of FIG. 2B). Additionally or alternatively, the radii of curvature of the first curved portions 312a-b are different than the radii of curvature of the second curved portions 318a-b. The flexible members 306a-b have a transverse cross-section that is different from a transverse cross-section of the flexible members 308a-b.

The flexible members 306a-b and 308a-b also include a plurality of substantially planar inner clamping surfaces 322a-b and 324a-b that engage a valve shaft when the collet 300 is drawn into a coupling component such as, for example, the lever 120 of FIGS. 1A, 1B and 2A. The inner clamping surfaces 322a-b and 324a-b form a substantially rectangular or square bore 326 configured to receive a substantially square shaft (e.g., the valve shaft 132 of FIG. 1B). The first and second plurality of flexible members 306a-b and 308a-b may be formed by slits or openings 328a-d. Each of the flexible members 306a-b and 308a-b provides a corresponding one of the inner clamping surfaces 322a-b and 324a-b and a corresponding one of the outer surface 310a-b and 316a-b, respectively.

The outer surfaces 310a-b and 316a-b include groove portions or recesses 330a-d and 332a-d and the inner clamping surfaces 322a-b and 324a-b include groove portions or recesses 334a-b and 336a-b, respectively, to enable the flexible members 306a-b and 308a-b to provide or concentrate a clamping force to the corners of a square end of the a valve shaft. The grooves 334a-b and 336a-b enable the corners of the inner surfaces 322a-b and 324a-b to engage or contact the corners of the square end of the valve shaft 132, thereby providing or concentrating a load to engage or clamp onto the corners of the square valve shaft 132. In this manner, the inner surfaces 322a-b and 324a-b advantageously enable the flexible members 306a-b and 308a-b to concentrate or provide the clamping force to the corners of the valve shaft 132, which is where the most effective torque transmission occurs between the collet 122 and the valve shaft 132 when the actuator 106 rotates the lever 120. Additionally, the grooves 330a-b and 332a-b enable the inner surface 208 of the lever 120 to contact or engage the corners of the curved surface portions 312a-b and 318a-b to transmit a greater clamping force or load onto the corners of the valve shaft 132 as the collet 122 is drawn within the lever 120.

The example collet 300 is received by the lever 120 in substantially the same manner as the collet 122 is received by the lever 120, as described in connection with FIGS. 1A, 1B, 2A and 2B. The coupling portion 304 engages the second opening 206 of the lever 120 so that the inner surface 208 of the second opening 206 engages the curved surface portions 312a-b and 318a-b of the flexible members 306a-b and 308a-b. As the collet 300 is drawn into the lever 120, the tapered inner surface 208 of the second opening 206 engages the tapered outer surfaces 310a-b and 316a-b to flex or displace the flexible members 306a-b and 308a-b toward an axis 340 of the collet 300. In this manner, when the collet 300 is drawn into the sleeve 138, the flexible members 306a-b and 308a-b are displaced toward and directly engage the corners a square end valve shaft such as, for example, the valve shaft 132 of FIG. 1B. In particular, when the sleeve 138 receives the example collet 300 (i.e., the collet 300 is drawn into the sleeve 138), the inner surfaces 322a-b and 324a-b directly engage the surfaces of the valve shaft 132 to provide a clamping force to the corners of the square end of the valve shaft 132. Additionally, the planar portions 314a-b and 320a-b of the outer surfaces 310a-b and 316a-b, respectively, have substantially smaller thickness than the curved surface portions 312a-b and 318a-b to facilitate the flexibility or displacement of the flexible members 306a-b and 308a-b toward the axis 340 of the collet 300 to provide a greater clamping force to the valve shaft when the collet 300 is drawn into the sleeve 138.

As discussed above, the example collet 300 advantageously enables the flexible members 306a-b and 308a-b to provide a concentrated or greater clamping force to the corners of a square end valve shaft, which is where the most effective torque transmission occurs between the lever 120 and a valve shaft (e.g., the valve shaft 132) when an actuator (e.g., the actuator 106) rotates the lever 120. Additionally, the curved surface portions 312a-b and 318a-b matably engage the non-planar inner surface 208 to provide an improved connection between the lever 120 and the collet 300 to prevent slippage and, thus, to further reduce lost motion between the collet 300 and the lever 120.

Although certain apparatus and articles of manufacture have been described herein, the scope of coverage of this patent is not limited thereto. To the contrary, this patent covers all apparatus and articles of manufacture fairly falling within the scope of the appended claims either literally or under the doctrine of equivalents.

What is claimed is:

1. A shaft coupling assembly for use with rotary valves, comprising:
   an elongated member;
   a coupling portion coupled to the elongated member and having a cross-sectional shape that has a first dimension along a first axis that is substantially larger than a second dimension along a second axis perpendicular to the first axis and a first opening configured to receive a rectangular shaft, wherein the coupling portion includes:
      at least a first flexible member having a first surface that at least partially defines the first opening and a second surface that at least partially defines the cross-sectional shape of the coupling portion, the first surface having a first recessed portion to form a first clamping surface of the first opening adjacent a first end of the first surface and a second clamping surface of the first opening adjacent a second end of the first surface opposite the first end, the first recessed portion to enable the first flexible member to concentrate a clamping force to the first and second clamping surfaces of the first surface,
      at least a second flexible member having a third surface that at least partially defines the first opening and a fourth surface that at least partially defines the cross-sectional shape of the coupling portion, and wherein the second flexible member has a cross-sectional area that is larger than a cross-sectional area of the first flexible member, and
      at least a third flexible member having a fifth surface that at least partially defines the first opening and a sixth surface that at least partially defines the cross-sectional shape of the coupling portion.

2. A shaft coupling assembly as defined in claim 1, further comprising a sleeve having a second opening to receive the elongated member and a third opening configured to receive the coupling portion.

3. A shaft coupling assembly as defined in claim 2, wherein the third opening defines a tapered surface that tapers inwardly toward the second opening.

4. A shaft coupling assembly as defined in claim 3, wherein the tapered surface of the third opening causes the first flexible member to be displaced toward an axis of the elongated member to cause the first and second faces to engage one or more corner surfaces of the rectangular shaft.

5. A shaft coupling assembly as defined in claim 2, wherein the sleeve is integrally formed with a lever that is configured to be rotatably coupled to an actuator.

6. A shaft coupling assembly as defined in claim 2, wherein the second surface further comprises a second recessed portion to form a third clamping surface of the second surface adjacent the first end and fourth clamping surface of the second surface adjacent the second end, the second recessed portion to enable the sleeve to concentrate a clamping force to the third and fourth clamping surfaces when the coupling portion is disposed within the third opening of the sleeve.

7. A collet as defined in claim 6, wherein the third opening of the sleeve comprises an inner surface having a plurality of grooves that enable the inner surface of the sleeve to engage only the third and fourth clamping surfaces of the second surface when the coupling portion is disposed in the sleeve.

8. A shaft coupling assembly as defined in claim 1, wherein the second surface further comprises a second recessed portion to form a third clamping surface of the second surface adjacent the first end and a fourth clamping surface of the second surface adjacent the second end.

9. A collet as defined in claim 8, wherein the first clamping surface is substantially aligned with the third clamping surface, and wherein the first recessed portion of the first surface is substantially aligned with the second recessed portion of the second surface.

10. A collet as defined in claim 9, wherein a cross-sectional area between the first clamping surface and the third clamping surface taken about a plane normal to a longitudinal axis of the elongate member is greater than a cross-sectional area between the first and second recessed portions taken about the plane normal to the longitudinal axis of the elongate member.

11. A shaft coupling assembly as defined in claim 1, wherein the first flexible member tapers toward the elongated member.

12. A shaft coupling assembly as defined in claim 1, wherein the cross-sectional shape of the coupling portion comprises an elliptical shape.

13. A collet as defined in claim 1, wherein the first and second clamping surfaces of the first surface are substantially parallel to a longitudinal axis of the elongated member.

14. A collet as defined in claim 1, wherein the third surface has a second recessed portion to form a third clamping surface of the first opening adjacent a first end of the third surface and a fourth clamping surface of the first opening adjacent a second end of the third surface opposite the first end, the second recessed portion to enable the second flexible member to concentrate a clamping force to the third and fourth clamping surfaces of the third surface.

15. A collet for use with a rectangular shaft, the collet comprising:
    a first plurality of flexible members configured to be coupled to an elongated member and each having a first inner surface and a first outer surface, wherein the first inner surface and the first outer surface define a first cross-sectional shape, the first outer surface having a first non-engaging area positioned between a first raised area and a second raised area to enable only the first and second raised areas to engage a lever and concentrate a first clamping force to the first and second raised areas; and
    a second plurality of flexible members configured to be coupled to the elongated member and each having a second inner surface and a second outer surface, wherein the second inner surface and the second outer surface define a second cross-sectional shape that is different from the first cross-sectional shape of the first plurality of flexible members, the second outer surface having a second non-engaging area positioned between a third raised area and a fourth raised area to enable only the third and fourth raised areas to engage the lever and concentrate a second clamping force to the third and fourth raised areas.

16. A collet as defined in claim 15, wherein the first and second outer surfaces are to engage a third inner surface of an opening of a lever that is configured to cause the first and second plurality of flexible members to be displaced toward an axis of the elongated member, wherein the third inner surface defines an oblong shape.

17. A collet as defined in claim 15, wherein the elongated member is integrally formed with the first and second plurality of flexible members.

18. A collet as defined in claim 15, wherein the first and second inner surfaces of the respective first and second plurality of flexible members apply a third clamping force to the rectangular shaft when the first and second inner surfaces engage the rectangular shaft.

19. A collet as defined in claim 15, wherein the elongated member includes a threaded portion configured to engage at least one of a nut or a bolt.

20. A collet as defined in claim 15, wherein the first non-engaging portion comprises a first recessed surface positioned between the first and second raised areas and the second non-engaging portion comprises a second recessed surface positioned between the third and fourth raised areas.

21. A collet as defined in claim 20, wherein the first and second outer surfaces have different radii of curvature.

22. A collet for use with a rectangular shaft, the collet comprising:
    a first plurality of flexible members configured to be coupled to an elongated member and each having a first inner surface and a first outer surface, wherein the first inner surface and the first outer surface define a first cross-sectional shape; and
    a second plurality of flexible members configured to be coupled to the elongated member and each having a second inner surface and a second outer surface, wherein the second inner surface and the second outer surface define a second cross-sectional shape that is different from the first cross-sectional shape of the first plurality of flexible members, and wherein the first and the second outer surfaces are to engage a third inner surface of an opening of a lever that is configured to cause the first and the second plurality of flexible members to be displaced toward an axis of the elongated member to cause the first and the second inner surfaces to engage one or more surfaces of a rectangular shaft, wherein each of the flexible members includes a recessed portion to provide greater flexibility to the flexible members when the flexible members are displaced toward the axis of the elongated member.

23. A collet, comprising:
    a coupling portion coupled to an elongated member and having outer surfaces defining a cross-sectional shape and a first opening configured to receive a rectangular shaft, wherein the coupling portion comprises:
    a first flexible member having a first inner surface that at least partially defines the first opening and a first curved outer surface that at least partially defines the outer surfaces of the coupling portion, the first inner surface having a first non-engaging area positioned between a first raised area and a second raised area to enable only the first and second raised areas to engage the rectangular shaft when the rectangular shaft is disposed within the first opening and concentrate a clamping force to the first and second raised areas;
    a second flexible member having a second inner surface that at least partially defines the first opening and a second curved outer surface that at least partially defines the outer surfaces of the coupling portion, wherein the second flexible member has a transverse cross-section that is different than a transverse cross-section of the first flexible member; and
    a third flexible member having a third inner surface that at least partially defines the first opening and a third curved outer surface that at least partially defines the outer surfaces of the coupling portion.

24. A collet as defined in claim 23, wherein the outer surfaces define an oblong shape, wherein the first flexible member is configured to slide within a third opening of a lever having an oblong shape, and wherein a tapered surface of the third opening engages the first curved outer surface of the first flexible member to cause the first and second raised areas of the first inner surface to engage the rectangular shaft.

25. A collet as defined in claim 24, wherein the first flexible member is tapered.

26. A collet as defined in claim 23, wherein the first flexible member further comprises a first planar outer surface adjacent the first curved outer surface, wherein the first planar surface is recessed relative to the first curved outer surface to increase flexibility of the first flexible member.

27. A collet as defined in claim 23, wherein the second inner surface has a second non-engaging area positioned between a third raised area and a fourth raised area to enable only the third and fourth raised areas to engage the rectangular shaft when the rectangular shaft is disposed within the first opening and concentrate a clamping force to the third and fourth raised areas.

28. A collet as defined in claim 23, wherein the second flexible member further comprises a second planar outer surface adjacent the second curved outer surface, wherein the second planar outer surface is recessed relative to the second curved outer surface to increase flexibility of the second flexible member.

29. A collet as defined in claim 23, wherein the third inner surface has a non-engaging area positioned between a first raised area and a second raised area to enable only the first and second raised areas to engage the rectangular shaft when the rectangular shaft is disposed within the first opening and concentrate a clamping force to the first and second raised areas.

30. A collet as defined in claim 23, wherein the third flexible member is positioned opposite the first flexible member.

31. A collet as defined in claim 15, wherein the first and second outer surfaces define an oblong shape.

* * * * *